United States Patent [19]
Strong

[11] Patent Number: 5,937,728
[45] Date of Patent: Aug. 17, 1999

[54] POWER STEERING CONTROL VALVE WITH NOISE REDUCTION

[75] Inventor: Daniel J. Strong, Clinton Township, Mich.

[73] Assignee: TRW Inc., Lyndhurst, Ohio

[21] Appl. No.: 08/783,648

[22] Filed: Jan. 15, 1997

[51] Int. Cl.⁶ ........................................... F15B 9/10
[52] U.S. Cl. .................................... 91/375 A; 137/625.23
[58] Field of Search ....................... 91/375 A; 137/625.23

[56] References Cited

U.S. PATENT DOCUMENTS

| | | |
|---|---|---|
| 4,335,749 | 6/1982 | Walter . |
| 4,445,422 | 5/1984 | Bishop . |
| 4,461,321 | 7/1984 | Bacardit . |
| 4,852,462 | 8/1989 | Uchida et al. . |
| 4,860,635 | 8/1989 | Uchida et al. . |
| 5,417,244 | 5/1995 | Behrens et al. . |
| 5,690,143 | 11/1997 | Birsching ........................... 91/375 A X |

*Primary Examiner*—Gerald A. Michalsky
*Attorney, Agent, or Firm*—Tarolli, Sundheim, Covell, Tummino & Szabo

[57] ABSTRACT

A control valve (10) controls fluid flow between a pump (34) and a motor (20) in a hydraulic power assist steering system (12) for a vehicle having steerable wheels. The control valve (10) includes a valve core (40) and a valve sleeve (50) supported for relative rotation. The control valve (10) has an inlet port (80) for receiving fluid from the pump (34) and a return passage (100) for directing fluid from the control valve to the pump (34). The control valve (10) has a first motor port (84) for enabling fluid flow between the control valve and the motor (20). First and second closing orifices (1A-L, 2A-L) are in series between the first motor port (84) and the return passage (100). A third closing orifice (2-L) is located between a second motor port (86) and the return passage (100). The orifice (1A-L) is a relatively high pressure orifice and the orifice (2A-L) is a relatively low pressure orifice. Two high pressure orifices (1-L, 1A-L) spaced on opposite sides of the inlet port (80) remain at least partially open except when the valve is fully turned.

13 Claims, 6 Drawing Sheets

POWER STEERING CONTROL VALVE WITH NOISE REDUCTION

BACKGROUND OF THE INVENTION

1. Technical Field

The present invention relates to a valve for controlling fluid flow in a hydraulic power assist steering gear assembly.

2. Description of the Prior Art

A known control valve for controlling fluid flow in a hydraulic power assist steering gear assembly includes a valve core rotatable within a valve sleeve. The valve core and the valve sleeve each have a plurality of lands and grooves. When the valve core and the valve sleeve are in a neutral or centered condition, fluid pressure in opposite chambers of a hydraulic motor are equal. When the valve core and the valve sleeve are relatively rotated from the neutral condition, the lands and grooves on the valve core and the valve sleeve cooperate to direct fluid under pressure to one chamber of the motor, thereby to provide steering assist.

The lands and grooves in the valve core and the valve sleeve define very small orifices through which fluid flows. Large pressure differentials at these orifices can generate undesirable noise in the steering system.

SUMMARY OF THE INVENTION

The present invention is a hydraulic power assist steering system for a vehicle having steerable wheels. The system comprises a steering member movable to effect turning movement of the steerable wheels of the vehicle; a fluid motor for moving the steering member, the motor having first and second fluid chambers; a pump for supplying fluid to the motor; a control valve for controlling fluid flow between the pump and the motor; and conduits providing fluid communication between the motor and the pump and the control valve. The control valve comprises a valve core and a valve sleeve supported in a housing for relative rotation about an axis and a torsion bar interconnecting the valve core and the valve sleeve for biasing the control valve into a centered condition. The valve core has a generally cylindrical outer periphery adjacent to and rotatable within a generally cylindrical inner periphery of the valve sleeve.

The control valve has at least one group of ports extending through the valve sleeve, including (a) an inlet port for directing fluid from the pump to the inner periphery of the valve sleeve, (b) a first motor port for communicating fluid between the inner periphery of the valve sleeve and the first fluid chamber of the motor, and (c) a second motor port for communicating fluid between the inner periphery of the valve sleeve and the second fluid chamber of the motor. The inner periphery of the valve sleeve and the outer periphery of the valve core define fluid flow paths within the valve between the inlet port and the first and second motor ports and a return passage of the control valve.

The control valve is movable in a first direction from the centered condition to an off-center condition to produce an area of high pressure fluid at the first motor port. The conduits direct fluid from the area of high pressure fluid to the first fluid chamber of the motor to effect movement of the steering member.

The valve core and the valve sleeve each include a plurality of alternating, axially extending lands and grooves which cooperate to define a plurality of variable flow orifices in the fluid flow paths in the valve. The plurality of orifices includes first and second orifices in series between the first motor port and the return passage, the first and second orifices closing upon movement of the control valve in the first direction from the centered condition. The plurality of orifices includes a third orifice between the second motor port and the return passage, the third orifice closing upon movement of the control valve in the first direction from the centered condition.

One of the first and second orifices is a relatively high pressure orifice and the other one of the first and second orifices is a relatively low pressure orifice. The plurality of orifices includes two high pressure orifices spaced on opposite sides of the inlet port which define between them the area of high pressure fluid. Both of the two high pressure orifices remain at least partially open to enable a substantial amount of fluid flow therethrough when the control valve is in the off-center condition producing an area of high pressure fluid at the first motor port.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS OF THE INVENTION

Figure 1:
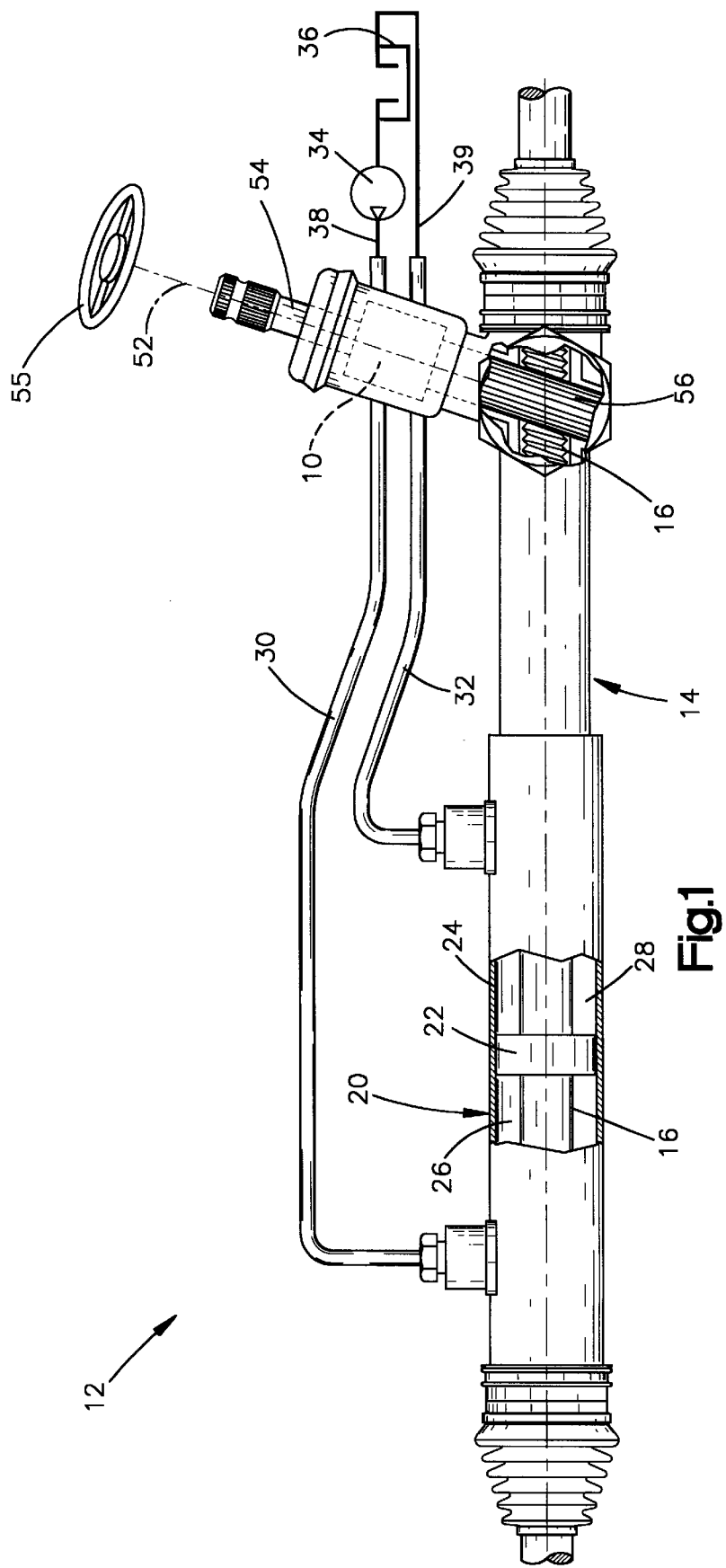
FIG. 1 is an elevational view, partly in section, of a hydraulic power assist rack and pinion steering gear assembly including a control valve in accordance with the present invention.

The present invention relates to a valve for controlling fluid flow in a hydraulic power assist steering gear assembly. As representative of the present invention, FIG. 1 illustrates schematically a hydraulic power steering control valve 10. The control valve 10 forms a part of a rack and pinion steering gear assembly 12.

The steering assembly 12 includes a housing 14. A steering member in the form of a rack 16 is supported by and is movable relative to the housing 14. Opposite ends of the rack 16 are connected by suitable linkage with steerable wheels (not shown) of the vehicle. Upon movement of the rack 16 relative to the housing 14, the steerable wheels of the vehicle are turned in a known manner.

The steering assembly 12 includes a hydraulic motor 20 for assisting the vehicle operator in turning the steerable wheels of the vehicle. The hydraulic motor 20 includes a piston 22 which is fixedly connected to the rack 16. The piston 22 is disposed in a cylinder 24 formed by the housing 14. The piston 22 divides the cylinder 24 into first and second fluid chambers 26 and 28.

The control valve 10 (described below in detail) is disposed in the housing 14. The control valve 10 is connected with the first and second chambers 26 and 28 of the motor 20 by a pair of conduits 30 and 32. The control valve 10 is also connected with a pump 34 and with a reservoir or sump 36, by another pair of conduits 38 and 39.

The control valve 10 includes a valve core 40 (FIG. 2) located within a valve sleeve 50 and coaxial with the valve sleeve. The valve core 40 and the valve sleeve 50 are supported in the housing 14, in a known manner, for relative rotation about an axis 52. An inner periphery 44 of the valve sleeve 50 is adjacent to and rotatable within an outer periphery 42 (FIG. 4) of the valve core 40.

The valve core 40 is connected for rotation with, and is preferably formed as one piece with, an input shaft 54 (FIG. 1). The input shaft 54 is connected for rotation with a steering wheel 55 of the vehicle. The valve sleeve 50 (FIG. 2) is connected for rotation with a pinion 56 (FIG. 1). The pinion 56 is in meshing engagement with the rack 16. A torsion bar shown schematically at 57 (FIG. 4) interconnects the input shaft 54 and the pinion 50 in a known manner.

Upon rotation of the vehicle steering wheel 55, the torsion bar 57 twists to enable the valve core 40 to rotate relative to the valve sleeve 50. Upon such relative rotation, the control valve 10 directs hydraulic fluid under pressure from the pump 34 to the motor 20. Operation of the hydraulic motor 20 moves the rack 16 and drives the pinion 56 in a follow-up manner to rotate the valve sleeve 50 relative to the valve core 40. The control valve 10 returns to a neutral condition when the steerable wheels of the vehicle have been turned to an extent corresponding to rotation of the steering wheel 55 and the input shaft 54.

The upper half (as viewed in FIG. 2) of the control valve 10 includes one complete group or set of ports (described below) for directing fluid flow between the pump 34 and the motor 20. The lower half of the control valve 10 includes another complete group or set of ports for directing fluid flow between the pump 34 and the motor 20. The lower half (as viewed in FIG. 2) of the control valve 10 is identical in construction and operation to the upper half of the control valve. Therefore, only the upper half of the control valve 10 is described herein in detail. Also, the operation of the control valve 10 for a left turn is described below; the operation of the control valve for a right turn is similar but opposite and is, therefore, not described.

The valve sleeve 50 (FIG. 2) has on its inner periphery 44 eight axially extending, circumferentially spaced lands 61, 62, 63, 64, 65, 66, 67 and 68. The sleeve lands 61–68 define eight axially extending, circumferentially spaced slots or grooves 71, 72, 73, 74, 75, 76, 77 and 78 which are spaced alternately between the sleeve lands.

A fluid inlet port 80 (FIG. 4) extends through a first one 61 of the sleeve lands 61–68, from the outer periphery 82 to the inner periphery 44 of the valve sleeve 50. The fluid inlet port 80 is connected in a known manner (not shown) with the conduit 38 and, thereby, with the output of the pump 34.

A first or left motor port 84 (FIG. 4) extends from the outer periphery 82 to the inner periphery 44 of the valve sleeve 50. The left motor port 84 terminates in the sleeve groove 78. A second or right motor port 86 extends from the outer periphery 82 to the inner periphery 44 of the valve sleeve 50. The right motor port 86 terminates in the sleeve groove 71. The sleeve grooves 71 and 78 are adjacent each other on the valve sleeve 50 and are spaced apart on opposite sides of the fluid inlet land 61.

The valve core 40 (FIG. 2) has on its outer periphery 42 eight axially extending, circumferentially spaced lands 81, 82, 83, 84, 85, 86, 87 and 88. The core lands 81–88 define eight axially extending, circumferentially spaced slots or grooves 91, 92, 93, 94, 95, 96, 97 and 98 which are spaced alternately between the core lands.

The valve core 40 has an axially extending return port or return passage 100. The return passage 100 is connected, in a manner not shown, with the conduit 39 and, thereby, with the sump 36. A first return channel 102 extends radially in the valve core 40 between the core groove 97 and the return passage 100. A second return channel 104 extends radially in the valve core 40 between the core groove 93 and the return passage 100. The core groove 93 is located diametrically opposite the core groove 97.

The inner periphery 44 of the valve sleeve 50 and the outer periphery 42 of the valve core 40 define fluid flow paths within the control valve 10 between the inlet port 80 and the motor ports 84 and 86 and the return passage 100.

The upper right portion (as viewed in FIG. 4) of the control valve 10 controls fluid flow between the fluid inlet port 80, the right motor port 86, and the second return channel 104. In the upper right portion of the valve core 40 each one of the core lands 81 and 82 has two chamfered corners or facets. The corners on the core land 81 (FIG. 4) are designated 110 and 112. The corners on the core land 82 are designated 114 and 116.

The corner 110 on the valve core 40 and the adjacent corner on the sleeve land 61 define a variable flow gap or orifice designated 1-L. The orifice 1-L controls fluid flow between the core groove 91 and the sleeve groove 71. As a result, the orifice 1-L controls fluid flow between the fluid inlet port 80 and the right motor port 86. The orifice 1-L varies in size dependent on the relative rotational position of the valve core 40 and the valve sleeve 50.

The corner 112 on the valve core 40 and the adjacent corner on the sleeve land 62 define a variable flow gap or orifice designated 1A-R. The orifice 1A-R controls fluid flow between the right motor port 86 and the core groove 92. The orifice 1A-R varies in size dependent on the relative rotational position of the valve core 40 and the valve sleeve 50.

The corner 114 on the valve core 40 and the adjacent corner on the sleeve land 62 define a variable flow gap or orifice designated 2-L. The orifice 2-L controls fluid flow between the core groove 92 and the sleeve groove 72. The orifice 2-L varies in size dependent on the relative rotational position of the valve core 40 and the valve sleeve 50.

The corner 116 on the valve core 40 and the adjacent corner on the sleeve land 63 define a variable flow gap or orifice designated 2A-R. The orifice 2A-R controls fluid flow between the sleeve groove 72 and the core groove 93. As a result, the orifice 2A-R controls fluid flow between the sleeve groove 72 and the second return channel 104 in the valve core 40. The orifice 2A-R varies in size dependent on the relative rotational position of the valve core 40 and the valve sleeve 50.

The upper left portion (as viewed in FIG. 4) of the control valve 10 is a mirror image of the upper right portion of the control valve. The upper left portion (as viewed in FIG. 4)

of the control valve 10 controls fluid flow between the fluid inlet port 80, the left motor port 84, and the first return channel 102.

Each one of the core lands 87 and 88 on the upper left portion of the valve core 40 has two chamfered corners or facets. The corners on the land 88 (FIG. 4) are designated 120 and 122. The corners on the land 87 are designated 124 and 126.

The corner 120 on the valve core 40 and the adjacent corner on the sleeve land 61 define a variable flow gap or orifice designated 1-R. The orifice 1-R controls fluid flow between the core groove 91 and the sleeve groove 78. As a result, the orifice 1-R controls fluid flow between the fluid inlet port 80 and the left motor port 84. The orifice 1-R varies in size dependent on the relative rotational position of the valve core 40 and the valve sleeve 50.

The corner 122 on the valve core 40 and the adjacent corner on the sleeve land 68 define a variable flow gap or orifice designated 1A-L. The orifice 1A-L controls fluid flow between the left motor port 84 and the core groove 98. The orifice 1A-L varies in size dependent on the relative rotational position of the valve core 40 and the valve sleeve 50.

The corner 124 on the valve core 40 and the adjacent corner on the sleeve land 68 define a variable flow gap or orifice designated 2-R. The orifice 2-R controls fluid flow between the core groove 98 and the sleeve groove 77. The orifice 2-R varies in size dependent on the relative rotational position of the valve core 40 and the valve sleeve 50.

The corner 126 on the valve core 40 and the adjacent corner on the sleeve land 67 define a variable flow gap or orifice designated 2A-L. The orifice 2A-L controls fluid flow between the sleeve groove 77 and the core groove 97. As a result, the orifice 2A-L controls fluid flow between the sleeve groove 77 and the first return channel 102 in the valve core 40. The orifice 2A-L varies in size dependent on the relative rotational position of the valve core 40 and the valve sleeve 50.

Figure 2:
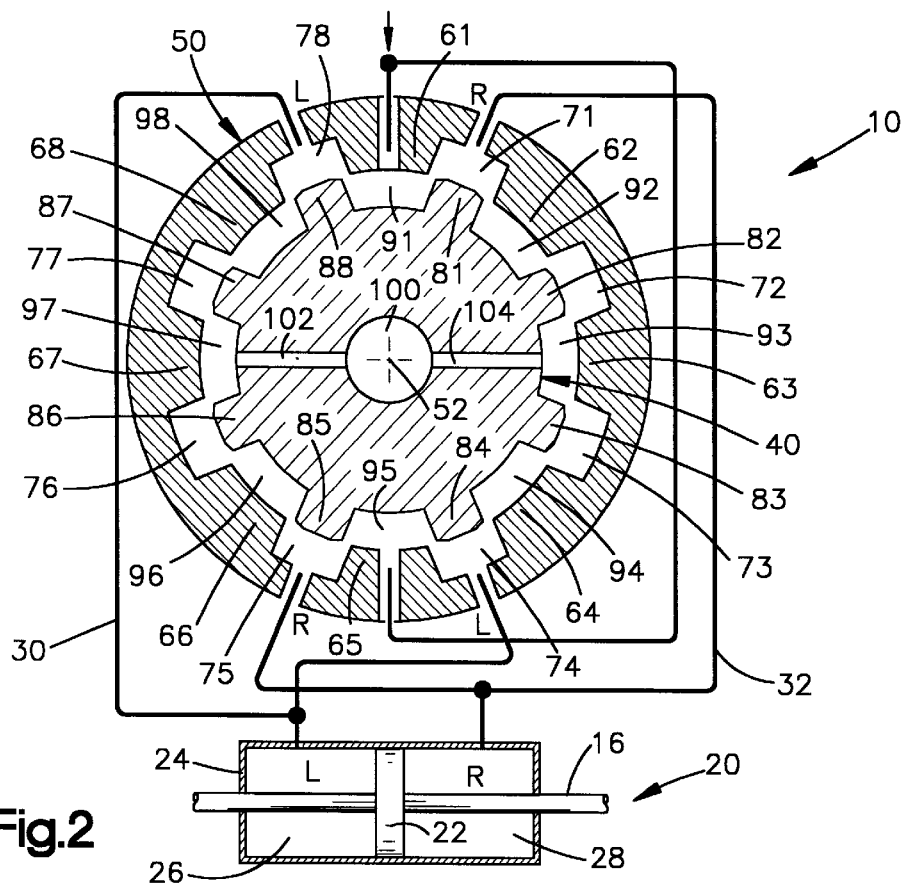
FIG. 2 is a schematic sectional view of the control valve of FIG. 1, shown in a centered condition.

When the valve core 40 and the valve sleeve 50 are in the neutral or centered condition shown in FIG. 2, each one of the core lands 81–88 is disposed radially inward of a respective sleeve groove 71–78. Fluid from the pump 34 flows into the control valve 10 through the fluid inlet port 80 and enters the core groove 91. Because the control valve 10 is in the centered condition, the orifice 1-R is the same size as the orifice 1-L. Therefore, fluid from the core groove 91 flows in substantially equal amounts through the orifices 1-R and 1-L into the sleeve grooves 78 and 71, respectively. The fluid pressure at the left motor port 84 is, therefore, the same as the fluid pressure at the right motor port 86. As a result, the pressures in the fluid chambers 26 and 28 in the cylinder 24 are substantially equal. Therefore, the piston 22 does not move in the cylinder 24, and no steering assist is provided to the rack 16.

When the control valve 10 is in the centered condition, the fluid in the sleeve grooves 78 and 71 flows out of those grooves in substantially equal amounts though the orifices 1A-L and 1A-R, respectively. The fluid flowing through the orifice 1A-L then flows through the orifices 2-R and 2A-L. This fluid flows to the sump 36 through the first return channel 102 and the return passage 100 in the valve core 40. The fluid flowing through the orifice 1A-R then flows through the orifices 2-L and 2A-R. This fluid flows to the sump 36 through the second return channel 104 and the return passage 100 in the valve core 40.

When the vehicle steering wheel 55 is turned in a first direction, the valve core 40 is rotated counterclockwise (as viewed in FIGS. 3 and 4) relative to the valve sleeve 50. The orifices 1-R, 2-R, 1A-R, and 2A-R open, or increase in size. The orifices 1-L, 2-L, 1A-L, and 2A-L substantially close, or decrease in size. Because of the closing of the orifices 1-L, 2-L, 1A-L, and 2A-L, steering assist is provided by the motor 20 to cause the steerable wheels of the vehicle to turn in a manner to move the vehicle to the left.

Specifically, when the vehicle steering wheel 55 is turned in the first direction, the orifice 1-R (FIG. 4) becomes larger than the orifice 1-L. With the orifices 1A-L and 1-L substantially closed, the fluid pressure in the sleeve groove 78 and at the left motor port 84 is substantially greater than the fluid pressure at the right motor port 86. As a result, the pressure in the fluid chamber 26 (FIG. 3) is substantially greater than the pressure in the fluid chamber 28. Therefore, the piston 22 moves in the cylinder 24 in a direction to the right as viewed in FIG. 3. The steerable wheels of the vehicle are turned in a direction to move the vehicle (not shown) to the left.

As the piston 22 moves in the cylinder 24, fluid is exhausted from the low pressure fluid chamber 28. This fluid flows through the conduit 32 and through the right motor port 86 (FIG. 4) into the control valve 10. The fluid flowing into the control valve 10 from the right motor port 86 flows through the orifices 1A-R, 2-L, and 2A-R. This fluid flows to the sump 36 through the second return channel 104 and the return passage 100.

Figure 3:
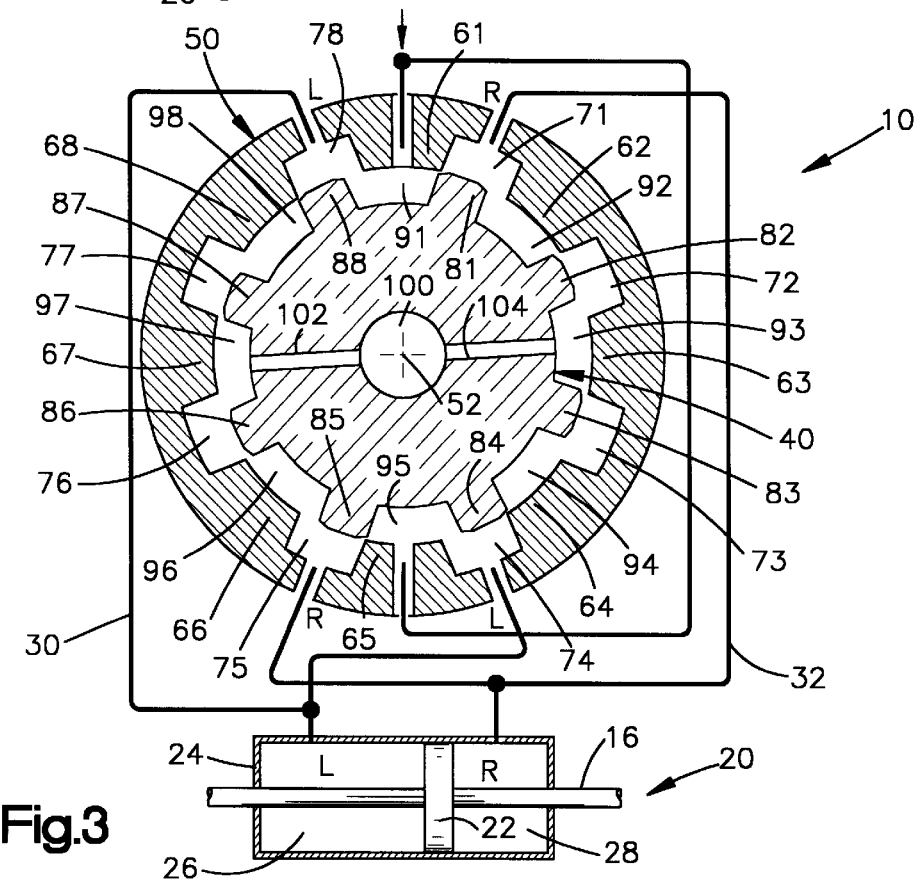
FIG. 3 is a view similar to FIG. 2 showing the control valve in an off-center condition.

During movement of the control valve 10 from the centered condition shown in FIG. 2 to the off-center condition shown in FIG. 3, the orifices 1-R, 1A-R, 2-R and 2A-R are opening. As a result, there is no significant pressure differential across the orifices 1-R, 1A-R, 2-R, and 2A-R which would generate noise. At the same time, the orifices 1-L, 1A-L, 2-L and 2A-L are closing. As a result, there are significant pressure differentials across the orifices 1-L and 1A-L and, thus, a significant potential for generating noise at these orifices.

Specifically, both the orifice 1-L and the orifice 1A-L are exposed, via the core groove 91 and the sleeve groove 78, to the pressure of the fluid at the high pressure side 26 of the piston 22. Therefore, the orifices 1-L and 1A-L have the highest pressure drops in the upper portion of the control valve 10—that is, there is the largest pressure differentials across these two gaps or orifices.

The pressure differentials across the orifices 2-L and 2A-L are less than the pressure differential across the orifices 1-L and 1A-L. Specifically, the orifice 2-L is exposed on one side to the return fluid from the low pressure side 28 of the piston 22 and, on the other side, to return (sump) pressure. This pressure differential is not as great as the pressure differential at either the orifice 1-L or the orifice 1A-L. Similarly, the orifice 2A-L is exposed to an intermediate pressure on one side and is at return (sump) pressure on the other, which is not as great as the pressure differential at either the orifice 1-L or the orifice 1A-L.

On the high pressure side of the control valve 10, the pressure differential between the left motor port 84 and the first return channel 102 is spread across the orifices 1A-L and 2A-L. Therefore, each one of the orifices 1A-L and 2A-L takes only a portion of the total pressure drop. As a result, there is relatively low turbulence and, therefore, relatively low noise, at each one of the orifices 1A-L and 2A-L.

Also, the increased back pressure provided by the orifices 2-L and 2A-L reduces the noise level at the orifices 1-L and 1A-L. For example, the orifice 2A-L adds back pressure to the orifice 1A-L. This back pressure suppresses bubbles at the orifice 1A-L, thus reducing noise generated there by bubbles which collapse there. On the low pressure side of the control valve 10, the orifice 2-L provides back pressure on the orifice 1-L. This back pressure suppresses bubbles at the orifice 1-L, and thus quiets the orifice 1-L.

The control valve 10 also enhances stability of the steering mechanism 12. The orifice 2-L, which is in series between the low pressure (right) motor port 86 and the second return channel 104, increases the back pressure on the low pressure side 28 of the piston 22. This back pressure resists flow of fluid out of the low pressure side 28 of the cylinder 24. This resistance to movement helps to stabilize the piston 22. Because the piston 22 is connected with the steerable wheels of the vehicle, steering stability is enhanced.

Figure 5:
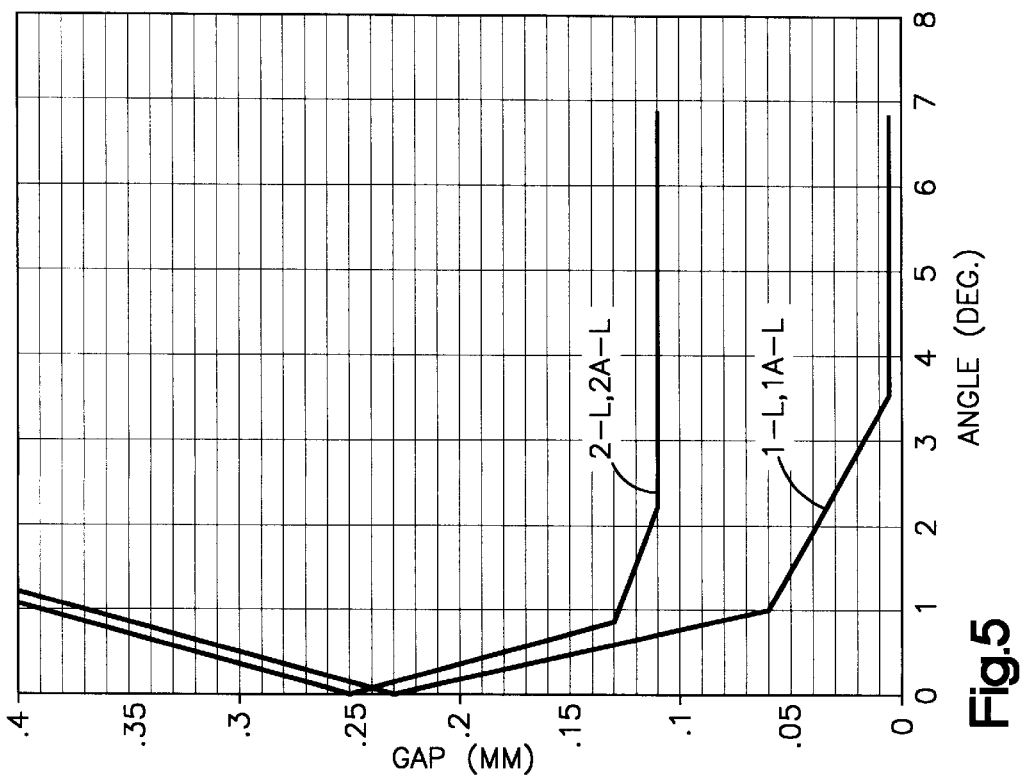
FIG. 5 is a graph which plots, for the control valve of FIG. 1, the areas of the closing orifices against degrees of relative rotation between the valve core and the valve sleeve.

FIG. 5 is a graph which plots, for the control valve 10, the areas of the closing orifices 1-L, 1A-L, 2-L and 2A-L against degrees of relative rotation between the valve core 40 and the valve sleeve 50. In the control valve 10, the orifice 1-L is always the same size as the orifice 1A-L. Also, the orifice 2-L is always the same size as the orifice 2A-L. The orifices 2-L and 2A-L are always larger than the orifices 1-L and 1A-L.

The orifices 1-L and 1A-L remain at least partially open to enable a substantial amount of fluid flow therethrough, whenever the valve angle of the control valve 10 is less than about 3° to about 3.5°, which represents a fully turned condition. The two high pressure orifices 1A-L and 1-L, which are spaced on opposite sides of the inlet port 80 close relatively rapidly to a small but substantial dimension during the first about 1° of movement of the control valve 109 from the centered condition. The orifices 1-L and 1A-L then close relatively slowly to an essentially fully closed condition during the next about 2.5° of movement of the control valve from the centered condition.

The orifice 2-L closes relatively rapidly to a dimension substantially larger than the closing orifices 1A-L and 1-L during the first about 1° of movement of the control valve 10 from the centered condition. The orifice 2-L closes gradually up until about 2°. The orifice 2-L then remains at substantially the same dimension during all further of movement of the control valve in the first direction from the centered condition.

The control valve 10 is identical in right turn operation. In right turn operation, the closing orifices are 1-R, 1A-R, 2-R and 2A-R. In the control valve 10, the orifice 1-R is always the same size as the orifice 1A-R. Also, the orifice 2-R is always the same size as the orifice 2A-R. The orifices 2-R and 2A-R are always larger than the orifices 1-R and 1A-R.

It should be understood that these orifice sizes are illustrative of a preferred embodiment of the invention and are not intended to be limiting of the scope of the invention. For example, FIGS. 7–10 (described below) illustrate other preferred embodiments oft the invention having orifice sizes and/or closing rates different from those illustrated with respect to FIGS. 1–5.

Other configurations of the orifices are possible. For example, orifice 2-L can be smaller than (or equal to) orifices 1-L and 1A-L at low valve angles. Also, orifice 2A-L can be smaller than (or equal to or greater than) orifice 2-L. The orifices 1-L and 1A-L are high pressure orifices which, together, substantially control the amount of assist (the pressure at the left motor port 84). At very low pressures or low valve angles, the orifices 2-L and 2A-L also affect assist pressure. At all other angles, the orifices 2-L and 2A-L are relatively low pressure orifices which provide noise reduction as described above.

Figure 6:
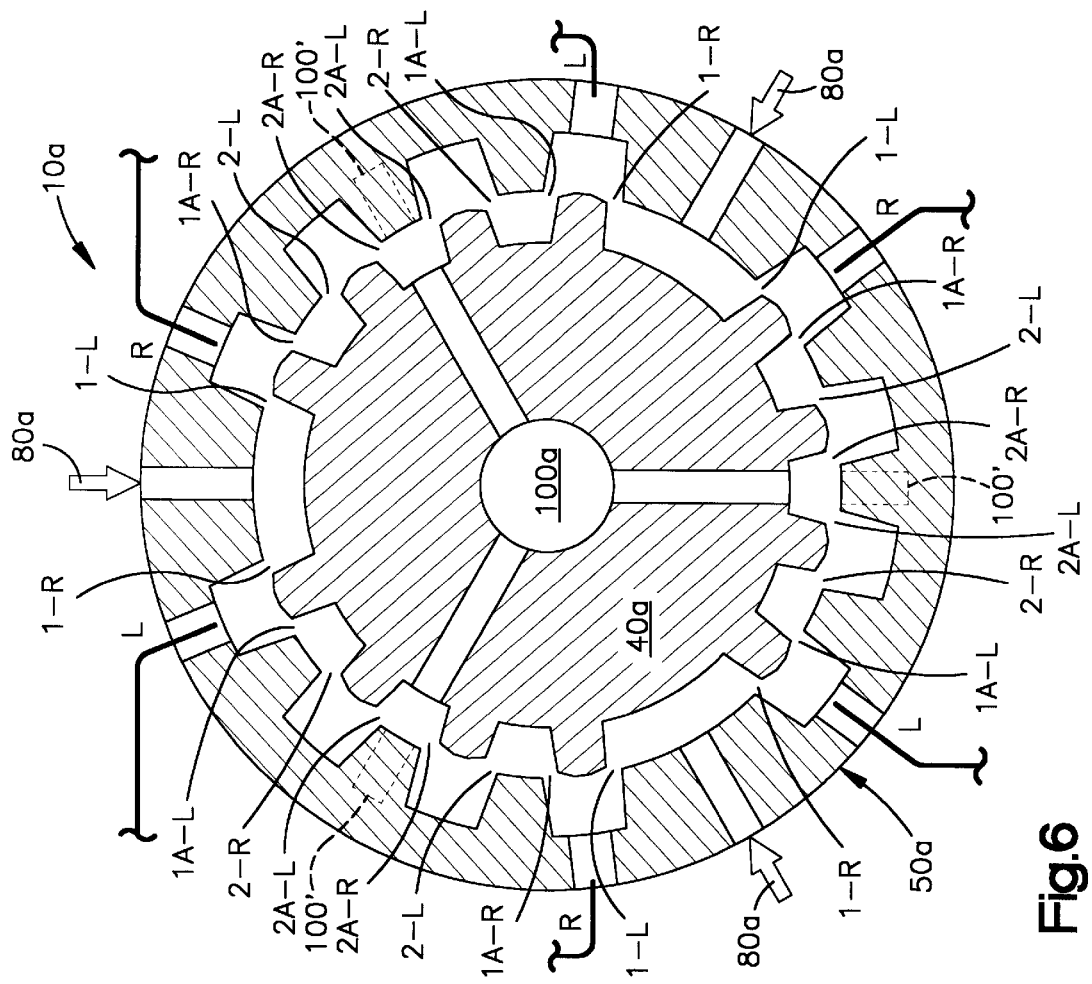
FIG. 6 is a view similar to FIG. 2 of a control valve in accordance with a second embodiment of the present invention.

FIG. 6 is a schematic view similar to FIG. 2 of a control valve 10a in accordance with a second embodiment of the present invention. The control valve 10a is generally similar in construction and mode of operation to the control valve 10. Parts of the control valve 10a which are similar to corresponding parts of the control valve 10 are given the same reference numeral with the suffix "a" added for clarity. The control valve 10a may be substituted, in the system 12, for the control valve 10.

In the control valve 10a, the valve core 40a and the valve sleeve 50a each have 12 grooves and lands, rather than eight. Thus, there are three sets, or groups, of ports for directing fluid flow between the pump 34 and the motor 20. Each one of the three groups of ports includes (a) an inlet port 80a for directing fluid from the pump 34 to the inner periphery of the valve sleeve 50a, (b) a first motor port "L" for communicating fluid between the inner periphery of the valve sleeve and the first fluid chamber 26 of the motor 20, and (c) a second motor port "R" for communicating fluid between the inner periphery of the valve sleeve and the second fluid chamber 28 of the motor. Each group of ports 80a, "L" and "R", in the control valve 10a, may be identical in construction and operation to the other two groups of ports. Return flow may, alternatively, be conducted through slots in the valve sleeve 50a, indicated schematically at 100', rather than through the valve core 40a.

Figure 8:
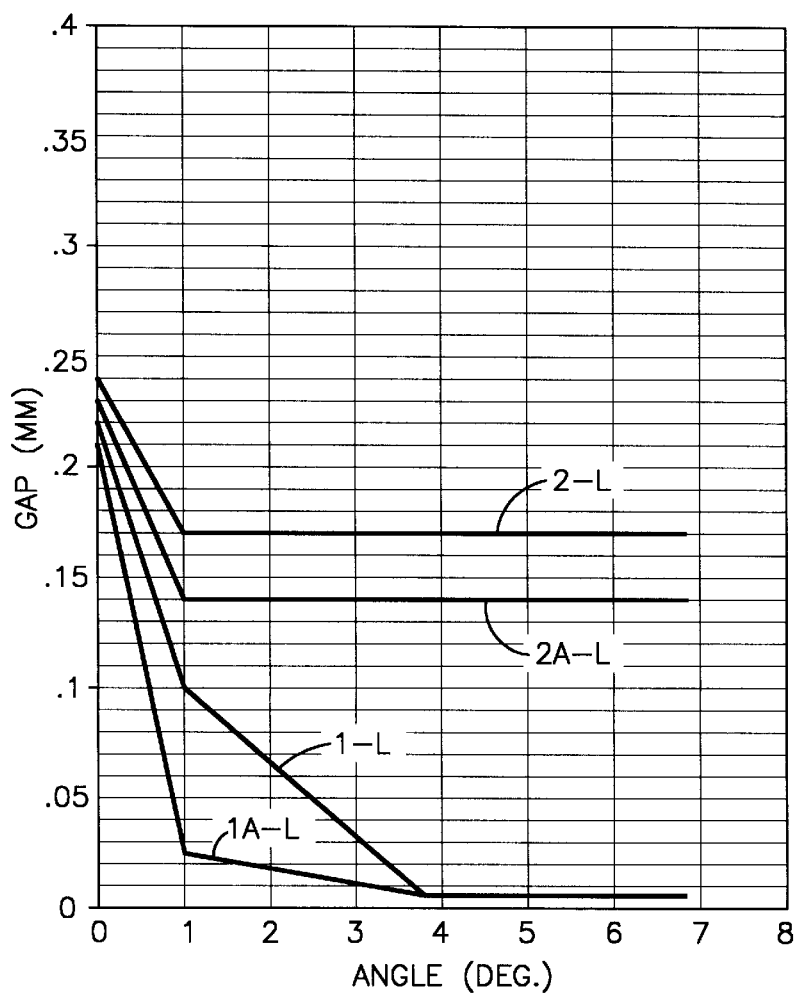
FIG. 8 is a graph similar to FIG. 5 for the control valve of FIG. 7.
Figure 9:
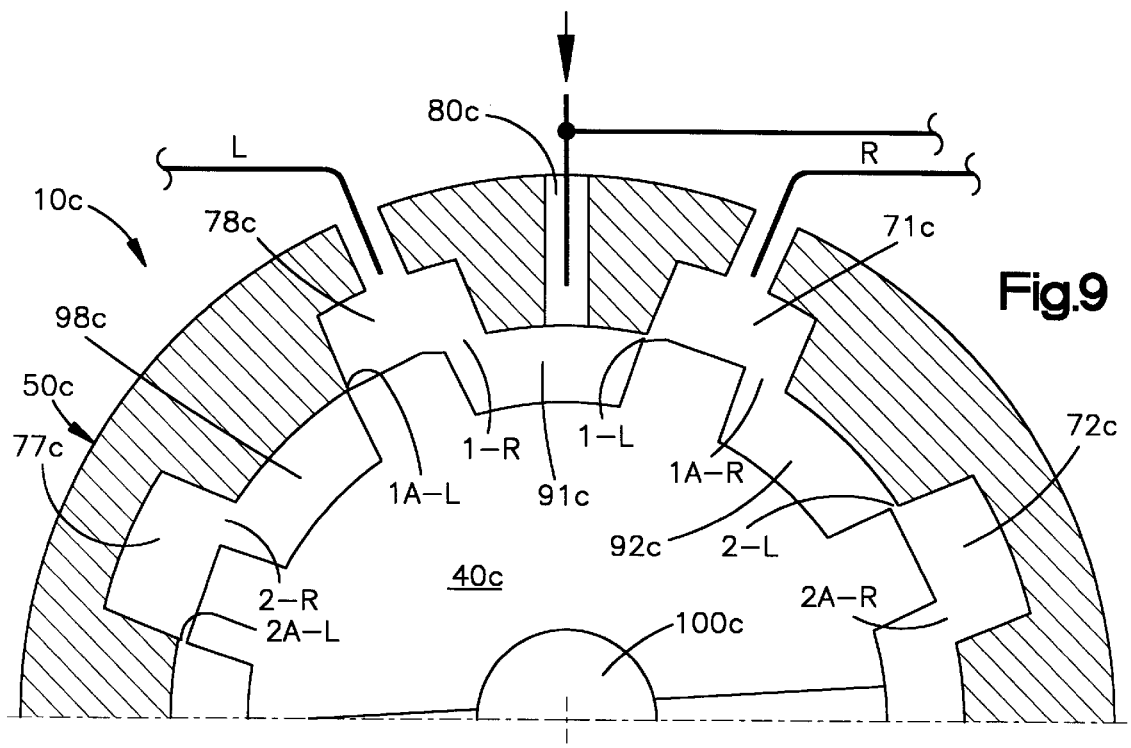
FIG. 9 is a view similar to FIG. 4 of a portion of a control valve in accordance with a fourth embodiment of the present invention.
Figure 10:
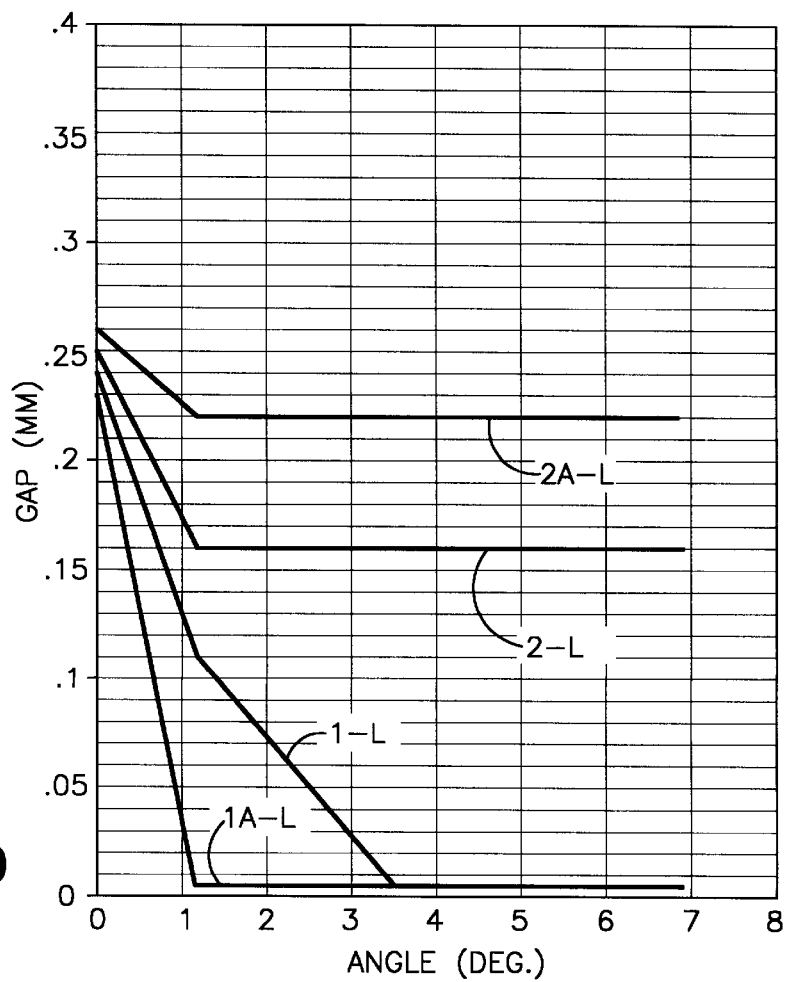
FIG. 10 is a graph similar to FIG. 5 for the control valve of FIG. 9.

The core lands and sleeve lands in the control valve 10a define a series of flow control gaps or orifices 1-L, 1A-L, 2-L, and 2A-L which close when a left turn is made. The orifices 1-R, 1A-R, 2-R, and 2A-R close when a right turn is made. The orifices in the control valve 10a are similar in construction and operation to the corresponding orifices in the control valve 10. Alternatively, the orifices in the control valve 10a may be constructed in the manner illustrated with respect to the control valve 10b (FIGS. 7 and 8) or the control valve 10c (FIGS. 9 and 10). Thus, the control valve 10a has the same noise reduction and steering stability benefits as does the control valve 10. The 12-land construction can enable the control valve 10a to operate at higher pressures than the 8-land control valve 10. The 12-land construction can also reduce noise because of the greater number of edges being used.

Figure 4:
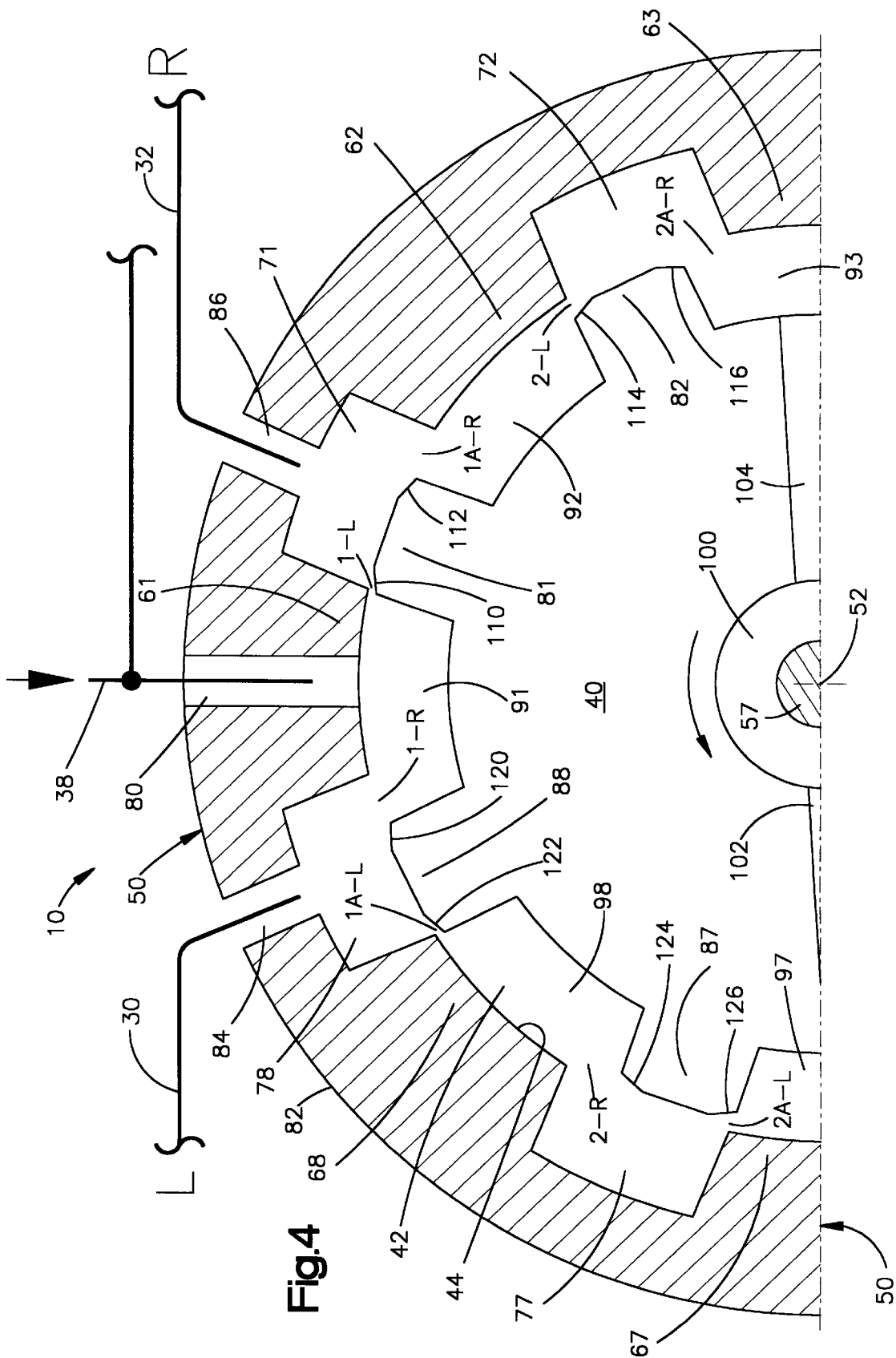
FIG. 4 is an enlarged view of a portion of FIG. 3.
Figure 7:
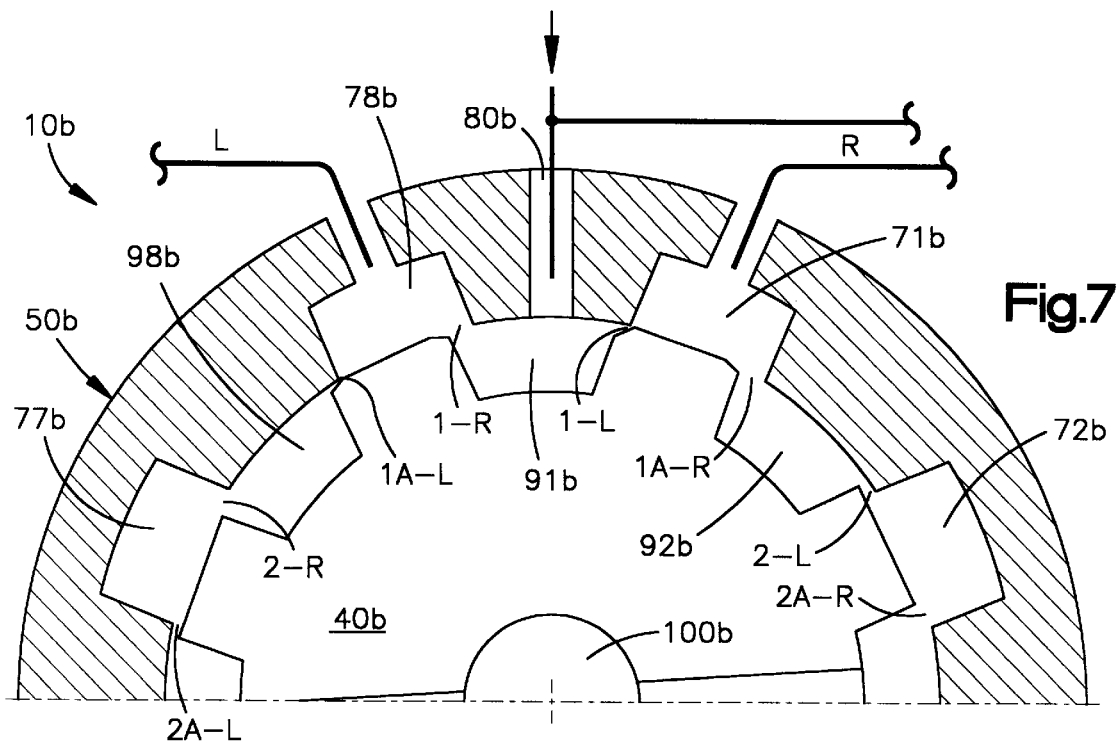
FIG. 7 is a view similar to FIG. 4 of a portion of a control valve in accordance with a third embodiment of the present invention.

FIG. 7 is a schematic view similar to FIG. 4 of a portion of a control valve 10b in accordance with a third embodiment of the present invention. The control valve 10b is generally similar in construction and mode of operation to the control valve 10, and may be substituted in the steering system 12 for the control valve 10. Parts of the control valve 10b which are similar to corresponding parts of the control valve 10 are given the same reference numeral with the suffix "b" added for clarity. FIG. 8 is a graph which plots, for the control valve 10b, the areas of the closing orifices (for a left turn) against degrees of relative rotation between the valve core and the valve sleeve.

In the control valve 10b, the lands of the valve core 40b are configured so that the closing orifices have areas which change in the manner indicated by the plots shown in FIG. 8. In this configuration, at all angles below full valve angle (about 3.5°), the gap 1-L is larger than the gap 1A-L, while the gap 2-L is larger than the gap 2A-L. For example, as can be seen from FIG. 8, at about 1° of valve angle, the gap 1-L is about three times as large as the gap 1A-L. Thus, the orifices 1-L and 1A-L close at different rates, but become substantially fully closed at about the same amount of movement of the control valve 10b from the centered condition. As another example, in the control valve 10b, the gap 2-L is larger than the gap 2A-L.

FIG. 9 is a schematic view similar to FIG. 4 of a portion of a control valve 10c in accordance with a fourth embodiment of the present invention. The control valve 10c is generally similar in construction and mode of operation to the control valve 10 and may be substituted in the steering system 12 for the control valve. Parts of the control valve 10c which are similar to corresponding parts of the control valve 10 are given the same reference numeral with the suffix "c" added for clarity. FIG. 10 is a graph which plots, for the control valve 10c, the areas of the closing orifices (for a left turn, against degrees of relative rotation between the valve core and the valve sleeve.

The control valve 10c has a more linear valve curve up to mid-pressures. In the control valve 10c, the lands of the valve core 40c are configured so that the closing orifices have areas which change in the manner indicated by the plots shown in FIG. 10. In this configuration, at all angles below full valve angle (about 3.5°), the gap 1-L is larger than the gap 1A-L. In addition, the gap 1A-L closes rapidly (that is, after only a small amount of rotation) to an essentially fully closed condition.

Thus, as can be seen from FIG. 10, at about 1° of valve angle, the gap 1A-L is essentially fully closed, while the gap 1-L is substantially open at that valve angle and does not fully close until about 3.5° of valve angle. Thus, the orifices 1-L and 1A-L close at different rates, and become substantially fully closed at different amounts of movement of the control valve 10c from the centered condition. Also in the control valve 10c, the gap 2A-L is larger than the gap 2-L.

From the above description of the invention, those skilled in the art will perceive improvements, changes and modifications in the invention. Such improvements, changes and modifications within the skill of the art are intended to be covered by the appended claims.

Having described the invention, I claim:

1. A hydraulic power assist steering system for a vehicle having steerable wheels, said system comprising:

a steering member movable to effect turning movement of the steerable wheels of the vehicle;

a fluid motor for moving said steering member, said motor having first and second fluid chambers;

a pump for supplying fluid to said motor;

a control valve for controlling fluid flow between said pump and said motor; and conduits providing fluid communication between said motor and said pump and said control valve;

said control valve comprising a valve core and a valve sleeve supported in a housing for relative rotation about an axis and a torsion bar interconnecting said valve core and said valve sleeve for biasing said control valve into a centered condition;

said valve core having a generally cylindrical outer periphery adjacent and rotatable within to a generally cylindrical inner periphery of said valve sleeve;

said control valve having at least one group of ports extending through said valve sleeve, including (a) an inlet port for directing fluid from said pump to the inner periphery of said valve sleeve, (b) a first motor port for communicating fluid between the inner periphery of said valve sleeve and said first fluid chamber of said motor, and (c) a second motor port for communicating fluid between the inner periphery of said valve sleeve and said second fluid chamber of said motor;

said inner periphery of said valve sleeve and said outer periphery of said valve core defining fluid flow paths within said valve between said inlet port and said first and second motor ports and first and second return passages of said control valve;

said control valve being movable in a first direction from the centered condition to an off-center condition to produce an area of high pressure fluid at said first motor port, said conduits directing fluid from said area of high pressure fluid to said first fluid chamber of said motor to effect movement of said steering member;

said valve core and said valve sleeve each including a plurality of alternating, axially extending lands and grooves which cooperate to define a plurality of variable flow orifices in said fluid flow paths in said valve;

said plurality of orifices including first and second orifices in series between said first motor port and said first return passage, said first and second orifices closing upon movement of said control valve in said first direction from the centered condition;

said plurality of orifices including a third orifice between said second motor port and said second return passage, said third orifice closing upon movement of said control valve in said first direction from the centered condition;

said plurality of orifices including a fourth orifice between said second motor port and said inlet port, said fourth orifice closing upon movement of said control valve in said first direction from the centered condition;

one of said first and second orifices being a relatively high pressure orifice and the other one of said first and second orifices being a relatively low pressure orifice;

said plurality of alternating, axially extending lands and grooves including a group of corners on said lands and grooves defining two high pressure orifices located on opposite sides of said inlet port which two high pressure orifices define between them said area of high pressure fluid, said plurality of orifices including said two high pressure orifices;

said group of corners on said lands and grooves having configurations such that both of said two high pressure orifices remain at least partially open to enable a substantial amount of fluid flow therethrough when said control valve is in the off-center condition producing an area of high pressure fluid at said first motor port.

2. A steering system as set forth in claim 1 wherein said two high pressure orifices spaced on opposite sides of said inlet port include said one of said first and second orifices which is a relatively high pressure orifice.

3. A steering system as set forth in claim 1 wherein said relatively high pressure orifice is exposed at one side to said area of high pressure fluid at said first motor port, and said relatively low pressure orifice is exposed on one side to the return fluid from the low pressure side of said fluid motor and on the other side to return pressure.

4. A steering system as set forth in claim 1 wherein said one of said first and second orifices which is a relatively high pressure orifice is located between said first motor port and said relatively low pressure orifice.

5. A steering system as set forth in claim 1 wherein said plurality of orifices includes an orifice, located between said first and second closing orifices in series between said first motor port and said return passage, which opens upon movement of said control valve in said first direction from the centered condition.

6. A steering system as set forth in claim 1 wherein said two high pressure orifices spaced on opposite sides of said inlet port which define between them said area of high pressure fluid remain at least partially open to enable a substantial amount of fluid flow therethrough during the first about 3° of movement of said control valve from the centered condition.

7. A steering system as set forth in claim 6 wherein said two high pressure orifices spaced on opposite sides of said inlet port close relatively rapidly to a small but substantial dimension during the first about 1° of movement of said control valve from the centered condition and then close relatively slowly to an essentially fully closed condition during the next about 2.5° of movement of said control valve from the centered condition.

8. A steering system as set forth in claim 7 wherein said third orifice between said second motor port and said return passage which closes upon movement of said control valve in said first direction from the centered condition closes relatively rapidly to a dimension substantially larger than said first and second closing orifices during a first part of the movement of said control valve from the centered condition, and then remains at substantially the same dimension during further movement of said control valve in the first direction from the centered condition.

9. A steering system as set forth in claim 1 wherein said valve core and said valve sleeve each include eight alternating, axially extending lands and grooves which cooperate to define a plurality of variable flow orifices in said fluid flow paths in said control valve.

10. A steering system as set forth in claim 1 wherein said valve core and said valve sleeve each include twelve alternating, axially extending lands and grooves which cooperate to define a plurality of variable flow orifices in said fluid flow paths in said control valve.

11. A steering system as set forth in claim 1 wherein said two high pressure orifices spaced on opposite sides of said inlet port which define between them said area of high pressure fluid close at different rates and become substantially fully closed at about the same amount of movement of said control valve from the centered condition.

12. A steering system as set forth in claim 1 wherein said two high pressure orifices spaced on opposite sides of said inlet port which define between them said area of high pressure fluid close at different rates and become substantially fully closed at different amounts of movement of said control valve from the centered condition.

13. A hydraulic power assist steering system for a vehicle having steerable wheels, said system comprising:

a steering member movable to effect turning movement of the steerable wheels of the vehicle;

a fluid motor for moving said steering member, said motor having first and second fluid chambers;

a pump for supplying fluid to said motor;

a control valve for controlling fluid flow between said pump and said motor; and conduits providing fluid communication between said motor and said pump and said control valve;

said control valve comprising a valve core and a valve sleeve supported in a housing for relative rotation about an axis and a torsion bar interconnecting said valve core and said valve sleeve for biasing said control valve into a centered condition;

said valve core having a generally cylindrical outer periphery adjacent and rotatable within to a generally cylindrical inner periphery of said valve sleeve;

said control valve having at least one group of ports extending through said valve sleeve, including (a) an inlet port for directing fluid from said pump to the inner periphery of said valve sleeve, (b) a first motor port for communicating fluid between the inner periphery of said valve sleeve and said first fluid chamber of said motor, and (c) a second motor port for communicating fluid between the inner periphery of said valve sleeve and said second fluid chamber of said motor;

said inner periphery of said valve sleeve and said outer periphery of said valve core defining fluid flow paths within said valve between said inlet port and said first and second motor ports and a return passage of said control valve;

said control valve being movable in a first direction from the centered condition to an off-center condition to produce an area of high pressure fluid at said first motor port, said conduits directing fluid from said area of high pressure fluid to said first fluid chamber of said motor to effect movement of said steering member;

said valve core and said valve sleeve each including a plurality of alternating, axially extending lands and grooves which cooperate to define a plurality of variable flow orifices in said fluid flow paths in said valve;

said plurality of orifices including first and second orifices in series between said first motor port and said return passage, said first and second orifices closing upon movement of said control valve in said first direction from the centered condition;

said plurality of orifices including a third orifice between said second motor port and said return passage, said third orifice closing upon movement of said control valve in said first direction from the centered condition;

one of said first and second orifices being a relatively high pressure orifice and the other one of said first and second orifices being a relatively low pressure orifice;

all of said lands and grooves having configurations such that all of said orifices in said valve remain at least partially open when said control valve is in the off-center condition producing an area of high pressure fluid at said first motor port.

\* \* \* \* \*